(12) United States Patent
Mischler et al.

(10) Patent No.: US 8,285,866 B2
(45) Date of Patent: Oct. 9, 2012

(54) SYSTEM AND METHOD FOR STREAMING CONTENT

(75) Inventors: Denis Mischler, Thorigne Fouillard (FR); Francois Gerard, Beignon (FR)

(73) Assignee: Thomson Licensing (FR)

( * ) Notice: Subject to any disclaimer, the term of this patent is extended or adjusted under 35 U.S.C. 154(b) by 2 days.

(21) Appl. No.: 12/735,712

(22) PCT Filed: Feb. 12, 2009

(86) PCT No.: PCT/EP2009/051664
§ 371 (c)(1),
(2), (4) Date: Aug. 11, 2010

(87) PCT Pub. No.: WO2009/101154
PCT Pub. Date: Aug. 20, 2009

(65) Prior Publication Data
US 2010/0312907 A1    Dec. 9, 2010

(30) Foreign Application Priority Data

Feb. 14, 2008   (EP) .................................... 08300094

(51) Int. Cl.
*G06F 15/16* (2006.01)
(52) U.S. Cl. ......... 709/231; 709/227; 709/228; 709/230
(58) Field of Classification Search .................. 709/227, 709/228, 230, 231
See application file for complete search history.

(56) References Cited

U.S. PATENT DOCUMENTS

| 7,724,691 B2 * | 5/2010 | Mela et al. .................... 370/261 |
| 2004/0125757 A1 * | 7/2004 | Mela et al. .................... 370/261 |
| 2005/0100001 A1 * | 5/2005 | Liu ................................ 370/352 |
| 2006/0039367 A1 * | 2/2006 | Wright et al. ................. 370/382 |
| 2006/0041688 A1 * | 2/2006 | Wright et al. ................. 709/249 |
| 2006/0149811 A1 | 7/2006 | Bennett et al. |
| 2009/0132717 A1 * | 5/2009 | Maes ............................ 709/228 |
| 2010/0138545 A1 * | 6/2010 | Mela et al. .................... 709/227 |

FOREIGN PATENT DOCUMENTS

| WO | WO2004015920 | 2/2004 |
| WO | WO2007096474 | 8/2007 |
| WO | WO2008006696 | 1/2008 |

OTHER PUBLICATIONS

Haber et al., "Remote Service Usage Through SIP with Multimedia Access as a Use Case", The 18th Annual IEEE International Symposium on Personal, Indoor and Mobile Radio Communications (PIMRC '07), 2007 IEEE.
Search Report Dated August 5, 2009.

* cited by examiner

*Primary Examiner* — Mohamed Wasel
(74) *Attorney, Agent, or Firm* — Jack Schwartz & Associates, PLLC

(57) ABSTRACT

A system and method for streaming content. An application server is located on a local network and connected to a first network. A SIP based message including a request for streaming content from a local device located on the local network is received from a first device located on the first network. A SIP based message comprising a list of content available on the local network is sent to the first device A SIP based message is received from the first device for launching the streaming of at least one content from the list of content to at least one receiver located in a third network A SIP based message is sent to an application receiving module located in the third network to invite the at least one receiver to receive the at least one content.

4 Claims, 4 Drawing Sheets

SYSTEM AND METHOD FOR STREAMING CONTENT

This application claims the benefit, under 35 U.S.C. §365 of International Application PCT/EP2009/051664, filed Feb. 12, 2009, which was published in accordance with PCT Article 21(2) on Aug. 20, 2009 in English and which claims the benefit of European patent application No. 08300094.3, filed Feb. 14, 2008.

FIELD OF THE INVENTION

The present invention relates generally to content distribution and in particular to a method for streaming content.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Video services are deployed on the Internet under various distribution models. A first model uses IPTV and VOD services. A service provider sells an offer to a consumer for a television and VOD services based on streaming protocols (typically RTP) and offering control over the service with IGMP for channel selection and RTSP for playing control commands.

Content is stored on servers located in the operators network. In case of VOD, a service session is initiated on the end user's demand. The end user sends commands to the server (possibly via a proxy for security reasons) for controlling the delivery of the content. Potentially such services include capabilities for recording features on storage resource located in the operator's network. The identification, authentication and authorization procedures are processed by the services operator. The rights to access to the service are checked at the time the user is requesting that access. Identification, authentication and authorization are based on private user identity, secured exchange protocols and database under full control of the operator. This is the way operators deliver today IPTV services.

A second model is content download based on HTTP protocols. The end user asks for specific content which he can get with internet browser thanks to HTTP protocols. The content is not streamed but transferred from the server side to the consumer side in a pulling mode (the user is asking and getting the packet). Usually, the transmission bit rate is higher than what the content really requires for a smooth rendering and the packets are therefore temporarily stored on the end user side. It the transmission bit rate is momentarily lower than the minimal requirement, the rendering gets frozen and the play out appears to the end user as stumbled. If the access requires identification and authorization, it is often based on a login/password procedure.

The broadband access networks are now shaped for supporting these service offers. They provide high bit rate on the downstream (theoretical 25 Mps with ADSL2+) and much less in the upstream (theoretical capabilities up to 3 Mbps). VDSL2+ is even planned to provide a symmetric bit rate of 100 Mbps.

This opens new opportunities in the way the services are consumed, particularly by enriching the consumer environment with service provider like capabilities. The content permanently owned by the end user or temporarily available in his environment could be offered for remote access in different ways of consumption: remote access from external locations, sharing between several remote locations.

SUMMARY OF THE INVENTION

The present invention attempts to remedy at least some of the concerns connected with the prior art, by providing a method for streaming content between several remote locations.

The invention concerns a method at an application server located on a local network, the application server being connected to a first network. The method comprises the steps of receiving, from a first device located on the first network, a SIP based message comprising a request for streaming content from a local device located on the local network, sending to the first device a SIP based message comprising a list of content available on the local network, receiving a SIP based message from the first device for launching the streaming of at least one content from the list of content to at least one receiver located in a third network, and sending a SIP based message to an application receiving module located in the third network to invite the at least one receiver to receive the at least one content.

According to the invention, an application server performs content streaming reservation for content stored in a local network to devices located on another network, the third network. The control messages for setting up the reservation are SIP based message. The application server centralizes multiple functions: a function for checking the content available in the local network for being streamed to receivers located on other networks, a function for receiving requests for setting up a streaming session, and a function for inviting receivers for receiving the content. This method simplifies the setting up of the streaming session, under the control of the first device.

According to an embodiment, the list of content comprises streaming parameters of the content.

According to an embodiment, the method comprises the steps of receiving a response from the application receiving module, sending a SIP based message to the first device for informing the device that the streaming can start, and receiving a SIP based message from the first device for starting the streaming.

Another object of the invention is a method at an end user application module, comprising the steps of sending a SIP based message to an application server connected to a local network, the message comprising a request for streaming content from a local device located on the local network, receiving from the application server a SIP based message comprising a list of content available on the local network, and sending to the application server a SIP based message for launching the streaming of at least one content from the list of content to at least one receiver located in a third network.

According to an embodiment, the method comprises the step of receiving a SIP based message from the application server for informing that the streaming can start, and sending a SIP based message for starting the streaming.

According to an embodiment, the method comprises the step of receiving the streaming content.

Another object of the invention is a method at an application receiving module connected to a local network, comprising the steps of receiving a SIP based message from an application server for inviting at least one receiver located in the local network to receive streaming content, and if at least one device on the local network has been identified for rendering the invitation message, sending a response to the application server for receiving the content.

Another object of the invention is a computer program product comprising program code instructions for executing the steps of the process according to the invention, when that program is executed on a computer. By "computer program product", it is meant a computer program support, which may consist not only in a storing space containing the program, such as a diskette or a cassette, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIGS. 1, 2 and 3, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

The exemplary embodiment comes within the framework of content distribution using SIP control commands and RTP steaming, but the invention is not limited to this particular environment and may be applied within other frameworks.

Figure 1:
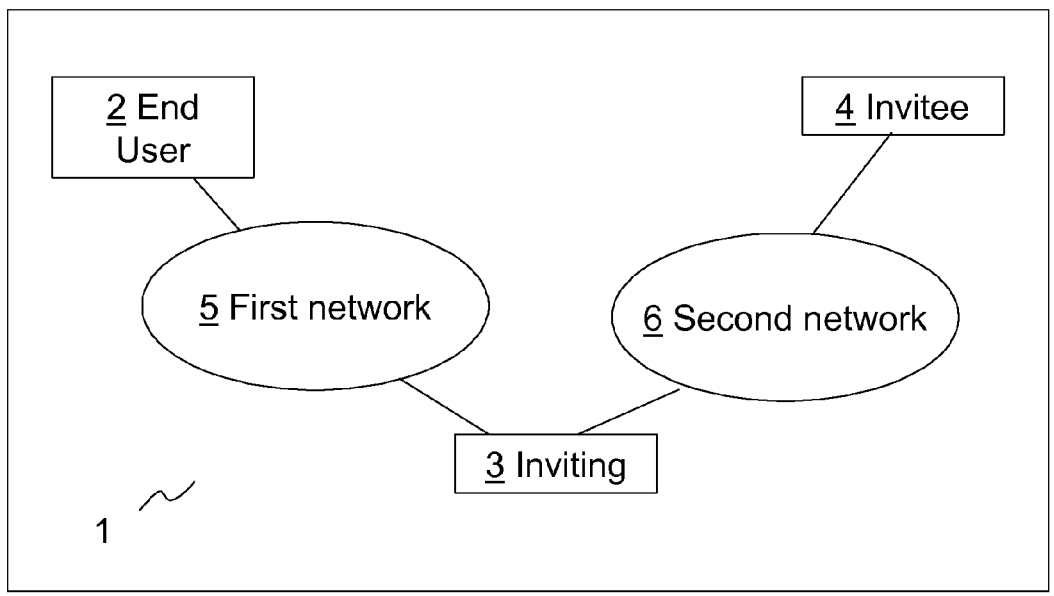
FIG. 1 is a block diagram of a system compliant with the embodiment.

The system 1 according to the embodiment is illustrated in FIG. 1. It comprises an end user terminal 2. The terminal is connected to an inviting home 3 through a first network 5 that is of packet type, such as an Internet network. In particular the end user terminal is a Session Initiation Protocol (SIP) capable terminal and the Internet network permits transmitting SIP packets. In particular the end user terminal is a cellular mobile phone comprising SIP capabilities. The inviting home comprises a broadband interface to the Internet.

The invitee home is connected to the inviting home through a second network. The second network is of the same type as the first network. Of course it might be a network of a type different from the first network. According to the embodiment, the second network is of Internet type and the inviting and invitee homes are connected to the second network through a broadband interface. Only one invitee home is indicated in FIG. 1, but the system might comprise more than one invitee home.

The end user device comprises an application, called hereinafter an end user application and noted EUA. The inviting home comprises an application server, noted AS. The invitee home comprises an application, called hereinafter an invitee application and noted IA. The EUA, the AS and the IA communicate as indicated hereinafter to set up an RTP sessions between the inviting home, the invitee home and the end user.

Figure 2:
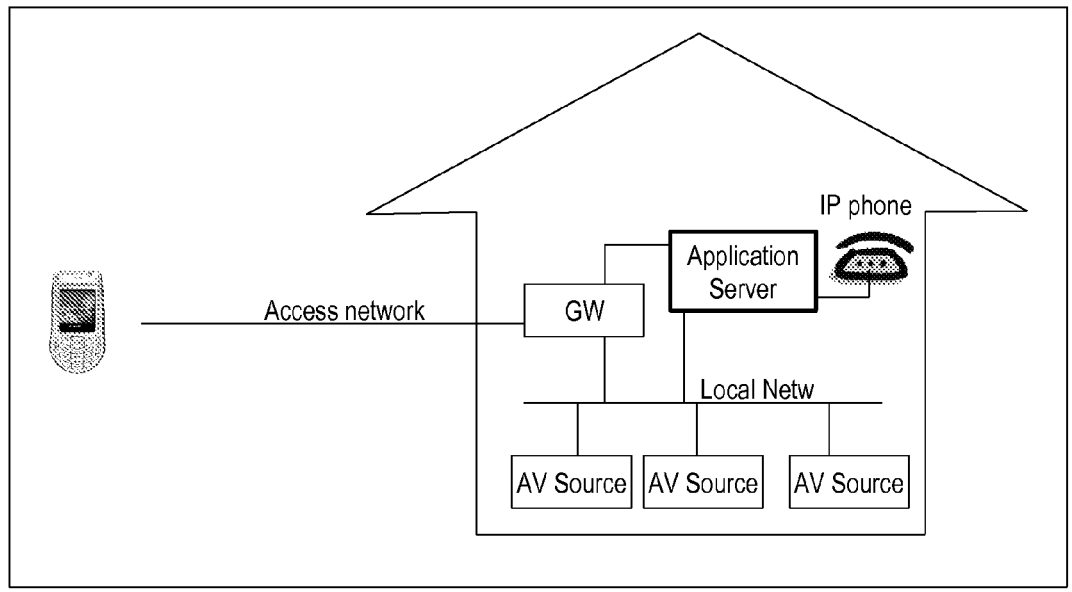
FIG. 2 illustrates a home inviting network compliant with the embodiment.

The inviting home is illustrated in FIG. 2. It comprises gateway GW that interfaces to the first network and the second network, which according to the embodiment are the Internet. The gateway is also connected to an AS. The AS is connected to the GW and to an IP phone. The inviting home also comprises a home network. The home network comprises a plurality of audio video source devices. The home network is of Ethernet type. Of course it might be any type of local area network, of wired or wireless technologies. The audio video source devices are source devices; they comprise storing means for storing audio video content that is distributed to the invitee homes. The gateway and the AS are also connected to the local home network.

The application server is embedded in a server device. Of course the application server might be embedded in a computer device or in the gateway.

The end user device comprises an end user application EUA that is adapted to send and receive SIP commands with the AS. It is also adapted to manage the RTP session with the AS. The EUA is addressable at a SIP address.

Figure 3:
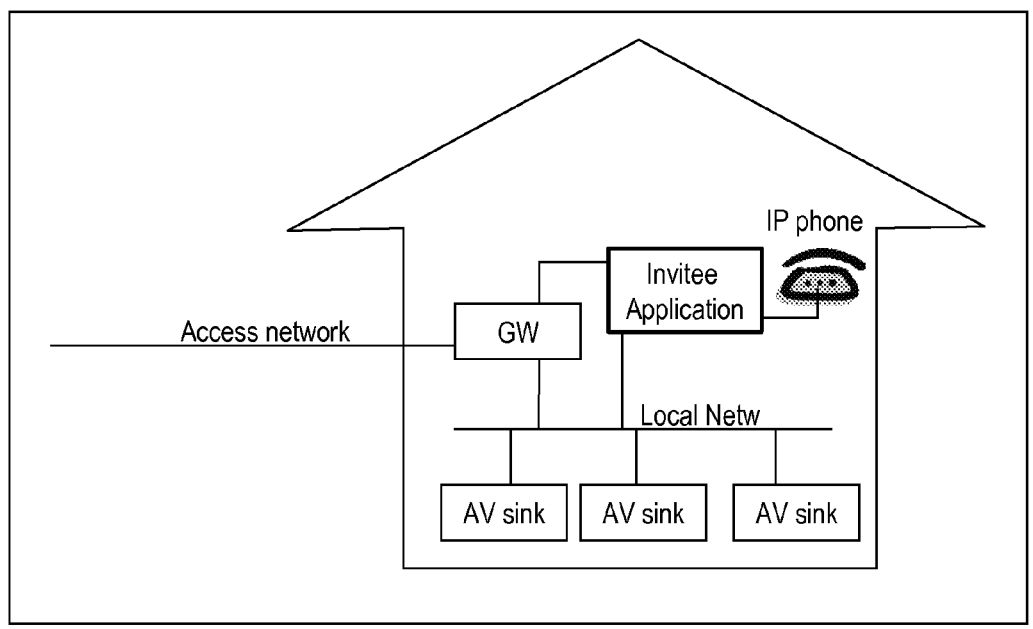
FIG. 3 illustrates a home invitee network compliant with the embodiment.

The invitee home is illustrated in FIG. 3. It comprises a gateway GW to connect to the second network. It comprises an invitee application IA connected to the gateway. An IP phone is connected to the IA. The IA and the GW are connected to a local network that is of a type well known to the skilled in the art. Audio video sink devices are also connected to the home network. They are adapted to receive the invitation messages intercepted by the IA and/or to receive the audio video content with the RTP session. The IA is an application that comprises the relevant modules and means to communicate with the AS, and perform all the features as indicated in the embodiment. It is embedded in an IA device. Of course the IA might be an application embedded in a computer device or in the gateway.

Figure 4:
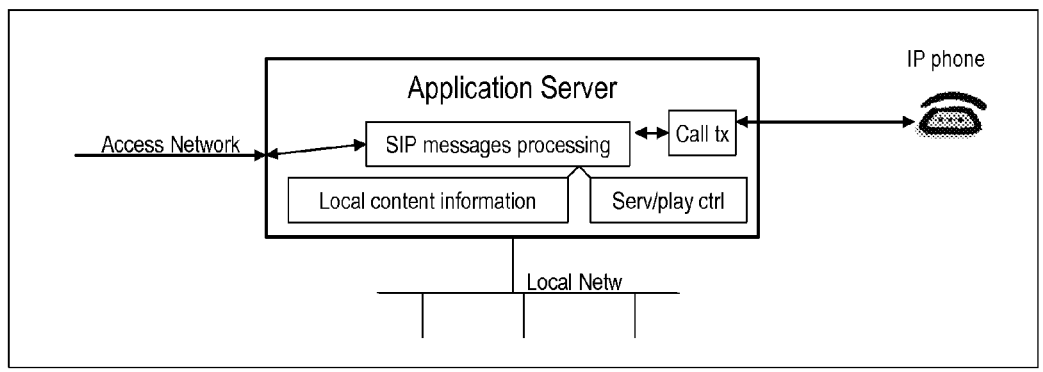
FIG. 4 illustrates an application server compliant with the embodiment.

The application server is illustrated in FIG. 4. It comprises an interface to the gateway to receive SIP messages. The SIP message processing module is adapted to intercept the SIP messages received from the gateway. The call module is adapted to setup a SIP session with the IP phone, and also with any remote device. The local content information module maintains a list of content available on the local network, together with the list of devices where the content is available.

Figure 5:
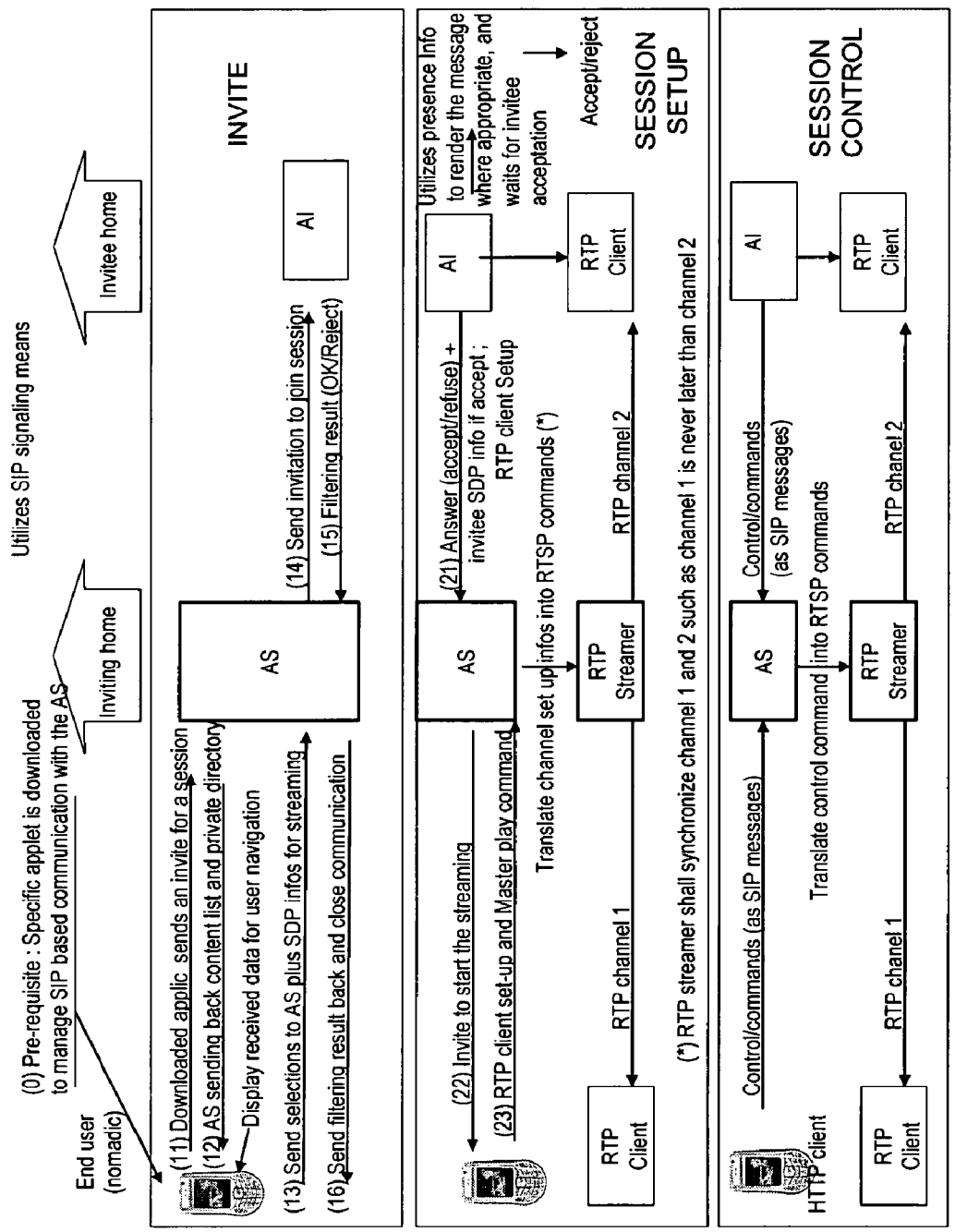
FIG. 5 is a flow chart of a method compliant with the embodiment.

The RTP session set up is illustrated in FIG. 5. It comprises the invitation set up, the session set up and the session control. The method according to the embodiment uses SIP based messages with SDP based payloads. The invitation setup is indicated hereinbelow.

(0) The EUA is downloaded in the cellular phone of the nomadic end-user. To enable the cellular phone to perform the method according to the embodiment, the cellular phone downloads the EUA. It is downloaded from the AS in a secure manner. Of course the EUA could also be downloaded form a server located in the Internet.

(11) The EUA indicates to the AS the fact that it wants to set up a RTP session with one or more invitee. The EUA establishes a SIP based session (invite) with the inviting home. The SIP session lasts until step 16 indicated below.

The EUA sends a SIP message at the SIP address of the home. The SIP message comprises a session invitation according to the session description protocol (SDP). Of course the SIP message could comprise any other type of field that, when present in the SIP message, would permit the AS to identify and to intercept the SIP message.

The SIP message is received at the gateway. The gateway routes the SIP message to the AS. The AS detects that the SIP message embeds a SDP session description message. It intercepts the SIP message and does not forward the SIP message to the IP phone.

The SIP message embedding a SDP message permits then to reach the AS and to trigger the access to in-home services.

(12) Once the AS has accepted the incoming invite and has recognized the call as a request to access to in-home content, it checks for audio video content available at the home network. The AS also maintains the list of relatives to whom the content could be sent. Then the AS is sending back a SIP message including the relevant information to the EUA. The relevant information comprises the list of audio video content available at the inviting home and the list of relatives to whom the content could be sent.

This information, sent into an XML format, is received by the EUA. The EUA presents the data on the terminal screen. The end user can browse these data and select content and a relative in the directory.

The list of relatives might also be already available at the EUA. The EUA would then only request the AS to provide the list of content available.

Along with the list of content available, the AS may indicate to the EUA all the relevant parameters relative to content, such as the size, the encoding format, and also the data rate at which the content can be streamed. It may also indicate the minimum requirements that should be supported at the receiver to be able to receive the content.

(13) The end-user selection information is then sent back to the AS. The information comprises the type of audio video selected and the list of invitees. The information required for streaming content to the RTP client is also sent. The AS creates a token for the duration of the service session. This token is for in-home utilization. The AS registers that information received from the EUA.

It might inform also the selected source audio video device on the possibility that a session would be set up later on.

(14) and (15) The AS exchanges SIP based messages with the invitee home in order to initiate the invitation to join the video sharing session. The invite message comprises indication of the inviting home, the content with features of the content. This permits the IA to know whether the content can be received by a device in the invitee home.

A filtering function at the IA checks the validity of the invitation. If the invitation is valid, a positive response is sent back to the AS.

(16) The inviting home then closes the SIP session with the end-user. There is then a waiting period for acceptance or refusal of the invitation by the invitee. This period is variable. The invitee may respond immediately or after a delay. A time out function is optionally implemented at the inviting home to limit this waiting period.

The RTP session setup is indicated hereinbelow.

On reception of the invitation from the invited home, the IA at the invitee home launches an alarm on a user interface at the invitee home to warn an end user on the reception of the invitation. The AI comprises a local presence module for detecting the devices on the local network that are available to receive the either content and/or the alarm indication. The local IP phone may be used for receiving an alarm message. The IA simulates a SIP call to the SIP phone, and sends a voice mail to the phone. Of course the IA might also send an alarm message to a remote SIP phone.

The user interface might be any kind of means that permits to warn the end user on the reception of the invitation. It might be a display on any kind of device such as a laptop, a television, a SIP phone, a PDA. The alarm would be a pop up window appearing on the display.

The alarm is intended to warn the end user on the reception of an invitation, and provide means for the end user to accept or deny the invitation.

(21) If invitee accepts the invitation, the answer (yes/no) and more information relative to the RTP channel to be setup are sent to the AS with SIP messages. In parallel a RTP client is started at a sink device of the invitee home. The RTP client is ready to play the RTP streams as soon as such audio video steams are received.

(22) (23) The AS then sends a SIP invite message to the EUA. This is intended to inform the end user terminal that the RTP session can start. The AS waits for the approval of the end user to start the RTP session. The EUA then acts as a master controller. It sends commands to the RTP source device to trigger the setting up of the relevant RTP channels and start the playing of the audio and video streams.

In parallel, the end user terminal starts a RTP client capable to play a RTP stream as soon as such stream is received.

The commands to the RTP source device have to be sent in the right synchronization to ensure the end-user can see the content before the invitee in the case of a double play out where two 2 RTP clients are running in different locations. Finer synchronization can be reached if needed thanks to utilization of the RTSP/RTP command parameters.

The invitee and the end user are both able to get control over the playing of the content, by utilization of SIP based messages which are translated at the inviting home location into RTPS and RTP messages for the control commands such as play/stop/forward/rewind.

The priority of control commands from the end user is higher than the one from the invitee.

If multiple invitees are invited to the same RTP sessions, the end user may set up different priority levels to the invitees.

Identification and authorization may be needed when the end user is requesting access to the inviting home. When the end user is sending the first SIP invite message for starting the session, the SIP message can include relevant identification information.

IA in invitee home is filtering SIP invite message depending on the inviting SIP address where only pre-declared SIP URLs are allowed. The IA may also filter the incoming SIP messages based on the subject of the message in the SIP body. This prevents the IA from receiving SPAM like invitations.

The IA in the invitee home uses local presence information. It is intended to detect the presence of relevant application in the local invitee network. It is further intended to enable the IA to find out the best terminal where rendering the invitation message. The end user at the invitee home can accept or refuse the invitation. The IA is sending back an SIP message to the end user mobile via the inviting application server to inform the end user about his decision (accept/refuse).

In the method according to the embodiment, the AS informs the EUA that a RTP session can start. It then waits for the EUA to start the RTP session, where the EUA and the invitee are the receivers of the RTP streams.

Alternatively, the EUA might not be a receiver of the RTP streams. Only the invitees would be the receivers of the streams. On reception of the answer from the AI, the AS could directly start the RTP session without informing the EUA. The AS might also only inform the EUA on the fact that the RTP session is starting with the selected invitees. The EUA may get control on the RTP session and perform the related control commands.

The embodiment discloses a method with one invitee and one RTP client. Of course the embodiment is also applicable to a system with more than one invitee, and/or more than one RTP client.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method at an application server located in a local network, said application server being connected to a first network and to a third network different from said first network, said method comprising the steps of:
   receiving, from a first device located in said first network, a first SIP based message comprising a request for streaming content from a local device located in the local network to a receiver located in said third network;
   sending to said first device a second SIP based message comprising a list of content available on the local network;
   receiving a third SIP based message from said first device for launching the streaming of at least one content from said list of content to said receiver; and
   sending a fourth SIP based message to an application receiving module located in said third network to invite said receiver to receive said at least one content from said local device.

2. The method according to claim 1, the list of content comprising streaming parameters of said content.

3. The method according to claim 1 comprising the steps of:
   receiving a response from said application receiving module;
   sending a fifth SIP based message to the first device for informing said device that the streaming can start; and
   receiving a sixth SIP based message from the first device for starting the streaming.

4. A computer program product, stored on a non-transitory computer-readable storage medium, wherein it comprises program code instructions for executing the steps of the process according to claim 1 when said program is executed on a computer.

* * * * *